(12) United States Patent
Chavez et al.

(10) Patent No.: US 11,371,805 B2
(45) Date of Patent: Jun. 28, 2022

(54) RANGE FINDING DISPLAY WITH POWER AND ANGLE INDICATORS

(71) Applicant: BUSHNELL INC., Overland Park, KS (US)

(72) Inventors: Alejandro Chavez, Overland Park, KS (US); Scott O. Nyhart, Shawnee, KS (US)

(73) Assignee: Bushnell Inc., Overland Park, KS (US)

( * ) Notice: Subject to any disclaimer, the term of this patent is extended or adjusted under 35 U.S.C. 154(b) by 352 days.

(21) Appl. No.: 16/738,315

(22) Filed: Jan. 9, 2020

(65) Prior Publication Data
US 2020/0217617 A1 Jul. 9, 2020

Related U.S. Application Data

(60) Provisional application No. 62/790,117, filed on Jan. 9, 2019.

(51) Int. Cl.
| | | |
|---|---|---|
| *G06G 7/80* | (2006.01) | |
| *F41G 3/06* | (2006.01) | |
| *F41G 1/34* | (2006.01) | |
| *F41G 1/38* | (2006.01) | |
| *G01C 3/00* | (2006.01) | |

(52) U.S. Cl.
CPC ............... *F41G 3/06* (2013.01); *F41G 1/345* (2013.01); *F41G 1/38* (2013.01); *G01C 3/00* (2013.01)

(58) Field of Classification Search
CPC ... F41G 3/06; F41G 1/345; F41G 1/38; F41G 3/065; G01C 3/00
See application file for complete search history.

(56) References Cited

U.S. PATENT DOCUMENTS

| | | |
|---|---|---|
| 5,926,259 A | 7/1999 | Bamberger et al. |
| 8,051,597 B1 | 11/2011 | D'Souza et al. |
| 8,089,549 B2 | 1/2012 | Yasuda et al. |
| 8,091,268 B2 | 1/2012 | York |
| 8,408,460 B2 | 4/2013 | Schneider et al. |
| 9,355,334 B1 | 5/2016 | Martinson |
| 2007/0097351 A1 | 5/2007 | York et al. |
| 2016/0091360 A1* | 3/2016 | Otani ............... G01D 13/28 177/178 |
| 2019/0243053 A1* | 8/2019 | Ono ............... G02B 6/0036 |
| 2019/0248240 A1* | 8/2019 | Fujita ............... B60K 35/00 |

OTHER PUBLICATIONS

The International Search Report and Written Opinion dated Mar. 25, 2020 in Application No. PCT/US20/12854.

* cited by examiner

*Primary Examiner* — Jamara A Franklin
(74) *Attorney, Agent, or Firm* — Walter M. Egbert, III; Richard J. Brown; Reed Smith LLP

(57) ABSTRACT

An enhanced display reticle for a range finding device, the reticle including a display in communication with a rangefinder and an inclinometer, the display defining a live angle meter and a power meter, the live angle meter including a plurality of incline hashes, the power meter including a plurality of strength hashes; a processor configured to illuminate one or more of the plurality of incline hashes in response to a signal from the inclinometer; illuminate one or more of the plurality of strength hashes in response to a signal received from the laser rangefinder.

20 Claims, 2 Drawing Sheets

RANGE FINDING DISPLAY WITH POWER AND ANGLE INDICATORS

CROSS-REFERENCE TO RELATED APPLICATIONS

This application claims priority to U.S. Provisional Patent Application 62/790,117 filed Jan. 9, 2019 entitled "Range Finding Display with Power and Angle Indicators," which is incorporated by reference in its entirety herein.

FIELD OF TECHNOLOGY

The present disclosure relates to range finding devices, more particularly to range finding devices with an enhanced-display reticles including real-time indicators.

BACKGROUND

Optical scopes, rangefinders, binoculars, and other vision systems may include data, other than aiming points that may be used to assist a user in surveying an environment. Additional information, presented to the user in compact, efficient and easily readable formats, allows the user to interact with the environment in a more comprehensive way. For example, riflescopes and range finding devices may include reticles or other optics that display data relevant to the user's environment that may assist the user in ranging, targeting, aiming, and firing a projectile in a more informed and accurate manner.

SUMMARY

Aspects of the present disclosure include an enhanced display, such as a reticle, that can present various real-time data points to a user. The enhanced-display reticle (EDR) can be implemented in a device such as a laser rangefinder (LRF), an optical scope, or a combination LRF/Optical scope. The device can be used for viewing, ranging, targeting, and firing of a projectile from, for example, a firearm or bow. According to one aspect, the enhanced-display reticle can include live, real-time meters for a laser rangefinder signal strength and angle of inclination. The EDR can further include an object identification indicator, a flash ring indicator, a fine point aiming indicator, center-mass indicator, cross-hair indicators, range indictors, and windage or drop point data.

In one aspect, an enhanced display reticle for a range finding device is provided, the reticle including a display in communication with a rangefinder and an inclinometer, the display defining a live angle meter and a power meter, the live angle meter including a plurality of incline hashes, the power meter including a plurality of strength hashes; and a processor configured to illuminate one or more of the plurality of incline hashes in response to a signal from the inclinometer; and to illuminate one or more of the plurality of strength hashes in response to a signal received from the laser rangefinder.

In some embodiments, the reticle further includes an object identification indicator. The object identification indicator can be configured to classify a target of the laser rangefinder into one of a plurality of categories. The categories can include an animal, an inanimate object, and a reflective object. In some embodiments, the object identification indicator includes a plurality of icons representation of each of the categories, and the processor is further configured to illuminate one of the plurality of icons in response to a signal received from the laser rangefinder.

In some embodiments, the reticle further includes a crosshair indicator configured to flash during a firing sequence of the laser rangefinder and further configured to have a fixed illumination upon acquisition of a target.

In some embodiments, the reticle further includes a flash ring indicator configured to flash during a firing sequence of the laser rangefinder and further configured to have a fixed illumination upon acquisition of a target.

In some embodiments, the reticle further includes a center mass indicator, a fine point indictor and a range indicator.

In some embodiments, the reticle further includes the display includes a transparent body and the live angle meter and power meter are illuminated.

In another aspect, an enhanced display reticle for a range finding device is provided, the reticle including a display in communication with a rangefinder and an inclinometer, the display defining a live angle meter, a power meter and an object identification indicator adjacent the power meter; and a processor configured to provide an indication of an incline angle in response to a signal from the inclinometer for display on the live angle meter; to provide an indication of the strength of a signal received from the laser rangefinder for display by the power meter; and to provide an indication of the reflectance characteristics of the signal received from the laser rangefinder for display by the object identification indicator.

In some embodiments, the live angle meter displays a numerical indication of the incline angle or a plurality of incline hashes. In some embodiments, the power meter displays a scale including a plurality of incline hashes.

In some embodiments, the object identification indicator is configured to classify a target of the laser rangefinder into one of a plurality of categories based on the reflectance characteristics. The categories can include an animal, an inanimate object, and a reflective object. The object identification indicator includes a plurality of icons representation of each of the categories, and the processor is further configured to illuminate one of the plurality of icons in response to a signal received from the laser rangefinder.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
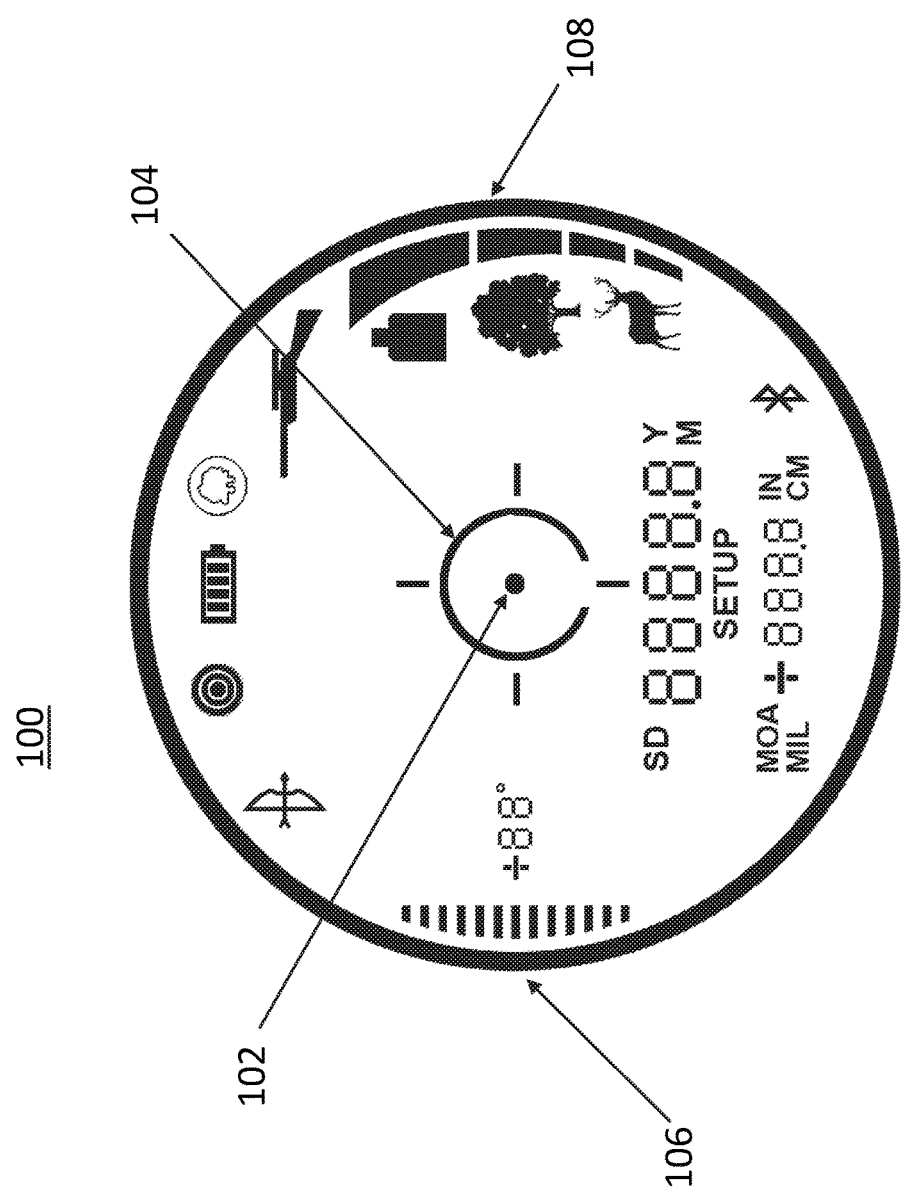
FIGS. 1 and 2 illustrate an EDR in accordance with an exemplary embodiment of the disclosed subject matter.
Figure 2:
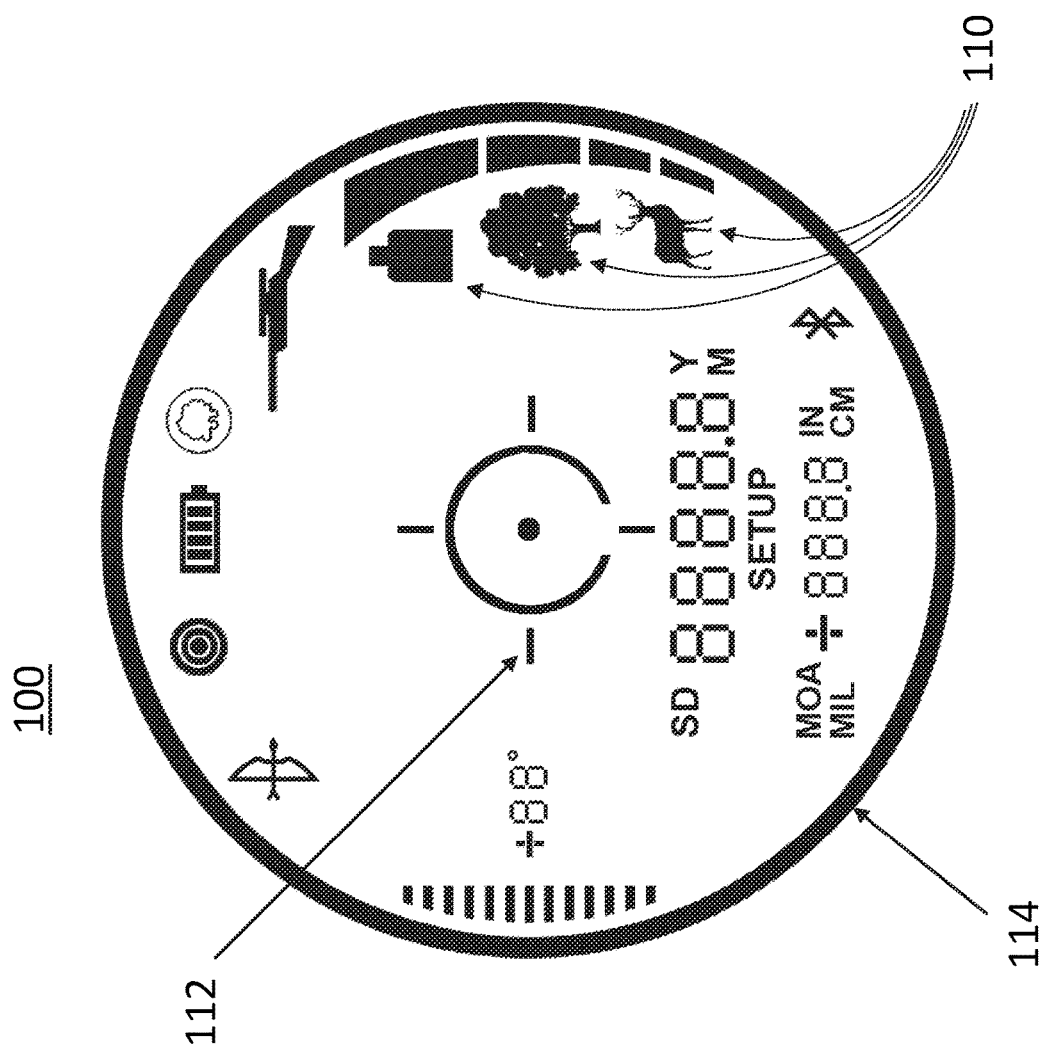

The present disclosure generally relates to an enhanced-display reticle (EDR) for a sighting device. FIGS. 1 and 2 depict illustrative examples and features of the EDR in accordance with aspects of the present disclosure. The EDR shown in FIGS. 1 and 2 depict a display for use in a laser rangefinder device. In some embodiments, the laser rangefinder device is a standalone device. In some embodiments, the laser rangefinder device is part of an aiming device such as a scope fixable to a projectile device, such as a firearm or bow.

As shown in FIG. 1, the EDR includes a display 100 having a transparent body and the indicators described below, e.g., the Fine Point Indicator 102, the Center Mass Indicator 104, Live Angle Meter 106, the Laser Power Meter 108, the Object Identification Indicator 110, the Crosshair Indicator 112, and the Flash Ring Indicator 114, etc., that can be illuminated, typically in color. The EDR further includes a processor (not shown) configured to receive a number of signals from instrumentation, such as an inclinometer, gyroscope, a laser rangefinder (LRF), etc., and selectively illuminate the indicators in the display 100, as described below.

As shown in FIG. 1, aspects of the EDR display 100 include a Fine Point Indicator 102 that allows the user or viewer the ability to acquire ranging information or a target and precisely align the laser rangefinder (LRF) on the target at long distances. The Fine Point Indicator 102 is displayed in conjunction with a Center Mass Indicator 104. The Center Mass Indicator 104 allows the user to quickly align the LRF at middle to close distances where the Fine Point Indicator is not required.

In some embodiments, the EDR display 100 includes a Live Angle Meter 106. The Live Angle Meter 106 allows the user to see, in real-time, the angle of inclination, or tilt, of the LRF. If the LRF is fixedly secured to a projectile device, the angle of inclination, shown in the Live Angle Meter 106 can indicate the angle of inclination of the projectile device.

The Live Angle Meter 106 can be displayed and implemented as a real-time illuminated scale by which hash marks or other indicators illuminate to show the severity of the tilt angle as the angle of inclination increases or decreases. The angle of tilt is determined by an inclinometer or the like. The Live Angle Meter 106 is driven by circuitry, hardware and software, within the device, including an inclinometer, gyroscope or the like, to measure the tilt angle of the device. The processor receives a signal indicative of the severity of the measured tilt from the inclinometer or gyroscope and translates the severity of the tilt into a number of hashes on the scale to be illuminated. The processor further controls the display of a numerical value of the tilt angle to be displayed adjacent to the scale. The tilt angle can be repeatedly measured at several cycles per second to produce a substantially real-time indication of the tilt angle of the LRF device.

The EDR display 100 also includes a Laser Power Meter 108 which displays the real-time power intensity of the laser signal received to the laser rangefinder. Upon initiating a ranging operation, the LRF typically transmits a laser beam towards the intended target. The laser beam intersects with the intended target, or other object, and reflects back to a receiving sensor in the LRF device. The time of flight between the LRF, the intended target, and back can be used to determine the distance from the LRF to the intended target. As the distance between the LRF and the intended target increases, the transmitted and reflected laser beams attenuates or weakens. Further, obstructions or signal noise in the line-of-sight can also weaken the laser signal as it travels to the intended target and back. The strength of the laser range finding signal can be of value to a user as an indicator of the accuracy of the ranging information. A weaker signal can indicate to the user that the range information is not accurate or there is substantial interference in the line-of-sight, leading the user to close the distance to the intended target or find another line-of-sight with fewer obstacles or less noise. The Laser Power Meter 108 can be driven by circuitry, hardware and software, within the device, to generate, transmit and receive a well-defined laser beam. The processor receives a signal indicative of the severity of the measured reflected laser beam and translates the signal into a number of hashes on the scale to be illuminated. In some embodiments, the Laser Power Meter 108 can display a numerical indication of the severity of the measured reflected laser beam, e.g., as a numerical scale, a percentage, or the like. The range can be repeatedly measured at several cycles per second to produce a substantially real-time indication of the reflected signal strength of the LRF device.

In conjunction with the Laser Power Meter 108, the EDR display 100 can include an Object Identification Indicator 110, shown in FIG. 2. In some embodiments, the Object Identification Indicator 110 is adjacent to the Laser Power Meter 108 and can provide the user with information as to the identity of the intended target, or other object. Object Identification Indicator 110 is configured such that, as the LRF determines the reflective energy and signal strength of the reflected beam, an internal processor can determine the type of object, e.g., if the object ranged is an animal, a tree or a reflective target, etc. An icon representative of the object, or classification of the object, can illuminate in the display. The classifications of potential objects can be defined such that each classification includes objects that absorb or reflect laser energy in a similar range or manner. For example, living animals, such as deer or other game, can absorb or reflect an amount of laser energy in a definable range compared to inanimate objects, such as trees, which can absorb and reflect an amount of laser energy in a distinguishable range from that of animals. Additionally, reflective materials, such as metal, signs, vehicles, or the like, can reflect a much higher amount of laser energy distinguishable from living and inanimate objects such that those types of objects can be given their own classification. Such a tool can be advantageous to a user when targeting an object or animal at great distance or in a crowded field.

Another feature of the EDR, according to one aspect of the present disclosure, can include a Crosshair Indicator 112 that can flash during a laser firing sequence. When a target has been acquired and the reflected laser beam has been received with sufficient strength, the cross hairs can remain illuminated and the obtained range value will be displayed on the reticle. Such an indicator can assist the user in determining when a satisfactory range has been determined on the appropriate target. As the LRF can be repeatedly cycling to provide a real-time assessment of range, the flashing crosshairs transforming to a fixed illumination can provide increased satisfaction to the user, that the information displayed on the EDR is accurate and received from the proper, intended target.

The EDR, according to another aspect of the present disclosure, can also include a Flash Ring Indicator 114 configured such that an illuminated ring at the outer edge of the display can flash during a laser firing sequence. When a target has been acquired the ring can turn off and the obtained range value can be displayed. As with the Crosshair Indicator 112, the Flash Ring Indicator 114 can alert the user to a condition under which the proper distance of the intended target has been determined. Given the potentially repeating and persistent cycling of the LRF to provide a real-time range measurement, the transition from flashing to a fixed illumination can signal the user that the proper range has been sufficiently determined.

The detailed description of aspects of the present disclosure set forth herein refers to the accompanying drawings, which show various embodiments by way of illustration. While these various embodiments are described in sufficient detail to enable those skilled in the art to practice the disclosure, it should be understood that other embodiments can be realized and that logical and mechanical changes can be made without departing from the spirit and scope of the disclosure. Thus, the detailed description herein is presented for purposes of illustration only and not of limitation. For example, the steps recited in any of the method or process descriptions can be executed in any order and are not limited to the order presented. Moreover, references to a singular embodiment can include plural embodiments, and references to more than one component can include a singular embodiment.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value or direction are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the foregoing description, it is understood that terms such as "first," "second," "third," "top," "bottom," "side," "above," "below," and the like, are words of convenience and are not to be construed as limiting terms unless expressly state otherwise. As used herein, the singular forms "a," "an," and "the" are intended to include the plural forms as well, unless the context clearly indicates otherwise. It will be further understood that the terms "comprises," "comprising," "having," "includes," "including," and/or variations thereof, when used herein, specify the presence of stated features, steps, operations, elements, and/or components, but do not preclude the presence or addition of one or more other features, steps, operations, elements, components, and/or groups thereof.

Although illustrative embodiments of the present disclosure have been described herein with reference to the accompanying drawings, it is to be understood that the present disclosure is not limited to those precise embodiments, and that various other changes and modifications may be made by one skilled in the art without departing from the scope or spirit of the disclosure.

What is claimed is:

1. An enhanced display reticle for a range finding device, the reticle comprising:
   a display in communication with a rangefinder and an inclinometer, the display defining a live angle meter and a power meter, the live angle meter including a plurality of incline hashes, the power meter including a plurality of strength hashes; and
   a processor configured to:
      illuminate one or more of the plurality of incline hashes in response to a signal from the inclinometer; and
      illuminate one or more of the plurality of strength hashes in response to a signal received from the laser rangefinder.

2. The enhanced-display reticle of claim 1 further comprising an object identification indicator.

3. The enhanced-display reticle of claim 2 wherein the object identification indicator is configured to classify a target of the laser rangefinder into one of a plurality of categories.

4. The enhanced-display reticle of claim 3 wherein the categories comprise an animal, an inanimate object, and a reflective object.

5. The enhanced-display reticle of claim 3, wherein the object identification indicator includes a plurality of icons representation of each of the categories, and the processor is further configured to illuminate one of the plurality of icons in response to a signal received from the laser rangefinder.

6. The enhanced-display reticle of claim 1 further comprising a crosshair indicator configured to flash during a firing sequence of the laser rangefinder and further configured to have a fixed illumination upon acquisition of a target.

7. The enhanced-display reticle of claim 1 further comprising a flash ring indicator configured to flash during a firing sequence of the laser rangefinder and further configured to have a fixed illumination upon acquisition of a target.

8. The enhanced-display reticle of claim 1 further comprising a center mass indicator, a fine point indictor and a range indicator.

9. The enhanced-display reticle of claim 1 wherein the display comprises a transparent body and the live angle meter and power meter are illuminated.

10. An enhanced display reticle for a range finding device, the reticle comprising:
    a display in communication with a rangefinder and an inclinometer, the display defining a live angle meter, a power meter and an object identification indicator adjacent the power meter;
    a processor configured to:
       provide an indication of an incline angle in response to a signal from the inclinometer for display on the live angle meter;
       provide an indication of the strength of a signal received from the laser rangefinder for display by the power meter; and
       provide an indication of the reflectance characteristics of the signal received from the laser rangefinder for display by the object identification indicator.

11. The enhanced-display reticle of claim 10, wherein the live angle meter displays a numerical indication of the incline angle.

12. The enhanced-display reticle of claim 10, wherein the live angle meter displays a scale including a plurality of incline hashes.

13. The enhanced-display reticle of claim 10, wherein the power meter displays a scale including a plurality of incline hashes.

14. The enhanced-display reticle of claim 10 wherein the object identification indicator is configured to classify a target of the laser rangefinder into one of a plurality of categories based on the reflectance characteristics.

15. The enhanced-display reticle of claim 14 wherein the categories comprise an animal, an inanimate object, and a reflective object.

16. The enhanced-display reticle of claim 14, wherein the object identification indicator includes a plurality of icons representation of each of the categories, and the processor is further configured to illuminate one of the plurality of icons in response to a signal received from the laser rangefinder.

17. The enhanced-display reticle of claim 10 further comprising a crosshair indicator configured to flash during a firing sequence of the laser rangefinder and further configured to have a fixed illumination upon acquisition of a target.

18. The enhanced-display reticle of claim 10 further comprising a flash ring indicator configured to flash during a firing sequence of the laser rangefinder and further configured to have a fixed illumination upon acquisition of a target.

19. The enhanced-display reticle of claim 10 further comprising a center mass indicator, a fine point indictor and a range indicator.

20. The enhanced-display reticle of claim 10 wherein the display comprises a transparent body and the live angle meter and power meter are illuminated in color.

* * * * *